(12) United States Patent
Henning et al.

(10) Patent No.: US 11,371,572 B2
(45) Date of Patent: Jun. 28, 2022

(54) DISC BRAKE FOR VEHICLES, IN PARTICULAR FOR COMMERCIAL VEHICLES

(71) Applicant: WABCO Europe BVBA, Brussels (BE)

(72) Inventors: Paul Henning, Schwetzingen (DE); Przemyslaw Kowalski, Wroclaw (PL)

(73) Assignee: WABCO Europe BVBA, Brussels (BE)

(*) Notice: Subject to any disclaimer, the term of this patent is extended or adjusted under 35 U.S.C. 154(b) by 54 days.

(21) Appl. No.: 16/885,676

(22) Filed: May 28, 2020

(65) Prior Publication Data
US 2020/0408268 A1 Dec. 31, 2020

(30) Foreign Application Priority Data

Jun. 27, 2019 (EP) .................................. 19182864

(51) Int. Cl.
| | |
|---|---|
| *F16D 65/56* | (2006.01) |
| *B60T 1/06* | (2006.01) |
| *F16D 55/226* | (2006.01) |
| *F16D 125/40* | (2012.01) |

(52) U.S. Cl.
CPC ............ *F16D 65/567* (2013.01); *B60T 1/065* (2013.01); *F16D 55/226* (2013.01); *F16D 2125/40* (2013.01)

(58) Field of Classification Search
CPC .. F16D 65/567; F16D 65/568; F16D 2125/26; F16D 2125/28; F16D 2125/64; F16D 2125/32; F16D 65/183
See application file for complete search history.

(56) References Cited

U.S. PATENT DOCUMENTS

| | | | |
|---|---|---|---|
| 6,269,914 B1* | 8/2001 | Angerfors | F16D 65/568 188/71.9 |
| 6,923,297 B1* | 8/2005 | Thomas | F16D 65/00 188/196 D |
| 2003/0173164 A1* | 9/2003 | Angerfors | F16D 65/568 188/71.7 |

FOREIGN PATENT DOCUMENTS

| | | |
|---|---|---|
| WO | 97/01044 A1 | 1/1997 |
| WO | 97/01045 A1 | 1/1997 |

\* cited by examiner

*Primary Examiner* — Nicholas J Lane
(74) *Attorney, Agent, or Firm* — Dickinson Wright PLLC

(57) ABSTRACT

A disc brake (1) for vehicles, in particular for commercial vehicles, includes a brake disc, at least two brake linings (3, 3a), and an adjusting spindle (4) axially adjustable toward the brake linings (3, 3a) for setting an air play (L) between the brake linings (3, 3a) and the brake disc (2). The adjusting spindle (4) has a pressure plate (4a) on a side facing the brake linings (3, 3a), and a pressure piece (9) arranged on the adjusting spindle (4) on a side axially opposite from the brake linings (3, 3a). The pressure piece (9) has an anti-rotation safeguard (10; 10a) for blocking a rotation (R) of the adjusting spindle (4), and the anti-rotation safeguard (10; 10a) axially engages the adjusting spindle (4).

13 Claims, 4 Drawing Sheets

DISC BRAKE FOR VEHICLES, IN PARTICULAR FOR COMMERCIAL VEHICLES

TECHNICAL FIELD

The invention relates to a disc brake for vehicles, in particular for commercial vehicles.

BACKGROUND

In general, the operation of a disc brake is known to a person skilled in the art in the field of disc brakes, for which reason the method of operation of the disc brake will not be described in greater detail. It is required for reasons of safety that the pressure point of the disc brake always remains constant. The pressure point is to be understood to mean the point at which the brake linings come into contact with the brake disc and the braking action of the vehicle occurs. The pressure point is displaced after every brake operation on account of the wear of the brake linings, as a consequence of which the driver has to press down the brake pedal further after every brake operation, in order that the braking action of the vehicle occurs. In order that the pressure point always remains constant, setting of the air play is required, that is to say the spacing between the brake disc and the brake linings. In the case of single-piston disc brakes for commercial vehicles, the adjustment of the air play takes place via an adjusting spindle. The adjusting spindle moves axially in the direction of the brake disc via an adjusting mechanism for setting the air play. Here, an undesired rotation of the adjusting spindle has to be ruled out. In the case of a direct drive of the adjusting spindle, the adjusting spindle is set in rotation for an axial movement.

In this case, it is not the adjusting spindle which is set in rotation movement, but rather the nut, in order to set the adjusting spindle in axial motion. To this end, the rotational movement of the adjusting spindle has to be prevented, in order that an axial movement of the adjusting spindle takes place.

In one solution, the adjusting spindle is fixed to the brake lining via a pin against an undesired rotation of the adjusting spindle.

SUMMARY

The present disclosure describes a disc brake making reliable securing against rotation of an adjusting spindle of the disc brake possible, with a simultaneous axial movement of the adjusting spindle without blocking.

A pressure piece of the disc brake has an anti-rotation safeguard, and the anti-rotation safeguard engages axially into the adjusting spindle. The anti-rotation safeguard prevents a rotation of the adjusting spindle about an axial axis of the adjusting spindle. That is to say, the adjusting spindle is connected to the pressure piece such that it cannot rotate, for which reason precise and constant axial setting of the air play is possible. The risk of an undesired rotation of the adjusting spindle or an undesired slip of the adjusting spindle at the connection of the adjusting spindle to the pressure piece is avoided. The force for setting the air play can be transmitted for the axial adjustment of the adjusting spindle without loss by way of a rotational movement of the adjusting spindle. Moreover, the anti-rotation safeguard is arranged in the adjusting spindle in a space-saving manner.

The anti-rotation safeguard serves at the same time during assembly as an aid for guiding and attaching the adjusting spindle to the pressure piece.

In a further embodiment, the anti-rotation safeguard comprises a fixing element, with an opening, and a connecting element, the connecting element engaging into the opening of the fixing element. The opening of the fixing element is shaped geometrically in such a way that it prevents a rotation of the connecting element about its own axis. The opening of the fixing element is arranged centrally in the region of the axial axis, with the result that the torsional forces of the adjusting spindle are distributed uniformly on the connecting element.

In a further embodiment, the connecting element is connected to the pressure piece in a positively locking manner. During the assembly, the connecting element is connected to the pressure piece in one assembly step. The pressure piece has an opening, into which the connecting element is introduced. A radial movement of the connecting element is no longer possible as a result of the positively locking connection to the pressure piece.

In a further refinement, axially in the direction of the adjusting spindle, the pressure piece has a guide of T-shaped configuration for receiving the connecting element. The base of the T-shaped guide is oriented axially along the axis of the adjusting spindle. The head of the T-shaped guide is oriented radially in the pressure piece, the base of the T-shaped guide being arranged closer axially to the adjusting spindle in the pressure piece than the head of the T-shaped guide.

Furthermore, it has been shown in one advantageous refinement that the connecting element is of plate-shaped configuration and, axially in the direction of the pressure piece, has lugs for fixing the connecting element in the guide of T-shaped configuration. The connecting element is particularly advantageously configured as a rectangular plate strip, and the longer one of the two sides of the plate strip is oriented along the axial axis of the adjusting spindle. The lugs are arranged radially next to one another on the narrow side of the plate strip. At most one third of the plate strip, starting from the axial length of the plate strip which is configured as a connecting element, is preferably arranged in the T-shaped guide of the pressure piece.

In a further embodiment, at least one lug can be deformed along a horizontal axis of the adjusting spindle. The width of the two lugs together, that is to say the shorter side of the connecting element in its overall width, is greater than a width of the base of the T-shaped guide. The axial positioning of the connecting element is achieved by way of a needle bearing which lies axially opposite the pressure piece, and by way of the pressure piece itself. The connecting element itself is pushed or plugged axially into the pressure piece from that side of the pressure piece which lies opposite the needle bearing, and is secured against falling out axially in the direction of the adjusting spindle by way of at least one horizontally bent lug. It is also conceivable in one alternative embodiment that the plate strip is introduced axially into the pressure piece on the side of the adjusting spindle, and the lugs are configured as springs. In order to guide the plate strip through the axially arranged base of the T-shaped guide, the lugs have to be pressed together radially, as a result of which a tension is produced. After the arrangement of the plate strip in the T-shaped guide of the pressure piece, the lugs of the plate strip expand radially, starting from the axial axis of the adjusting spindle, in the head of the T-shaped guide, and secure the plate strip against falling out axially in the direction of the adjusting spindle.

In a further embodiment, the connecting element and the pressure piece are configured as one structural unit. That is to say, the connecting element and the pressure piece are produced in one piece as a shaped part.

In a further refinement, in addition, the connecting element is of rectangular, square or hexagonal configuration. Any other shapes, such as a triangular shape or a polygonal shape, which prevent turning or a rotation of the adjusting spindle during an axial movement of the adjusting spindle in order to set the air play are also conceivable.

In a further embodiment, the fixing element is arranged in a positively locking manner in a groove of the adjusting spindle, axially on the opposite side of the pressure plate. The adjusting spindle is configured as a hollow shaped component and has an interior space. The groove is made on an inner wall of the adjusting spindle. Moreover, the groove runs around partially or completely on the inner wall of the adjusting spindle about the axial axis of the adjusting spindle. In the direction of the pressure piece, the groove has an open end. More specifically, in the direction of the pressure plate, the groove has a supporting wall for the fixing element, which supporting wall is configured as a bearing face, and a side wall which runs radially around the axial axis of the adjusting spindle.

In one development, the fixing element is a plate, the plate being produced from a metal material or a plastic. A composite material, that is to say a combination of the plate made from a metal material and a plastic material, is also conceivable. The plate is particularly preferably a punched metal part. The exterior shape and dimension of the plate corresponds to the shape of the groove. The plate is particularly preferably of plate-shaped, that is to say circular, configuration, and is fixed in all directions via a non-positive connection by way of being pressed in.

In a further refinement, the fixing element is arranged axially on the opposite side of the pressure plate of the adjusting spindle, the fixing element and the adjusting spindle being configured as one structural unit. That is to say, the fixing element and the adjusting spindle are formed from one shaped part. In a further embodiment, the adjusting spindle is a cold-worked pressed part. The fixing element is configured as a blind bore, a bottom of the blind bore being the fixing element. The blind bore can also be configured as a through hole, however, if the through hole is sealed towards the brake interior against external environmental influences.

In one development, the adjusting spindle has an opening along the axial axis of the adjusting spindle, the opening corresponding to the length and the shape of the connecting element. The opening begins in the fixing element which is configured as a bottom of the blind bore of the adjusting spindle. The axial configuration of the opening particularly preferably ends at the beginning of the pressure plate. The bore is at the same time a guide for the correct arrangement and orientation of the pressure piece during assembly.

In addition, it has proven advantageous that, in a further embodiment, the opening of the fixing element corresponds to the shape of the connecting element. The opening is defined in such a way that the connecting element can be guided smoothly through the opening, and at the same time serves as a locking means of the connecting element. However, the dimension of the opening is merely so great that turning or a rotation of the connecting element is prevented. In other words, the opening is configured as a locking means against turning or a rotation of the connecting element.

In the following text, selected exemplary embodiments of the invention will be described using the appended drawings.

DETAILED DESCRIPTION OF THE DRAWINGS

Figure 1:
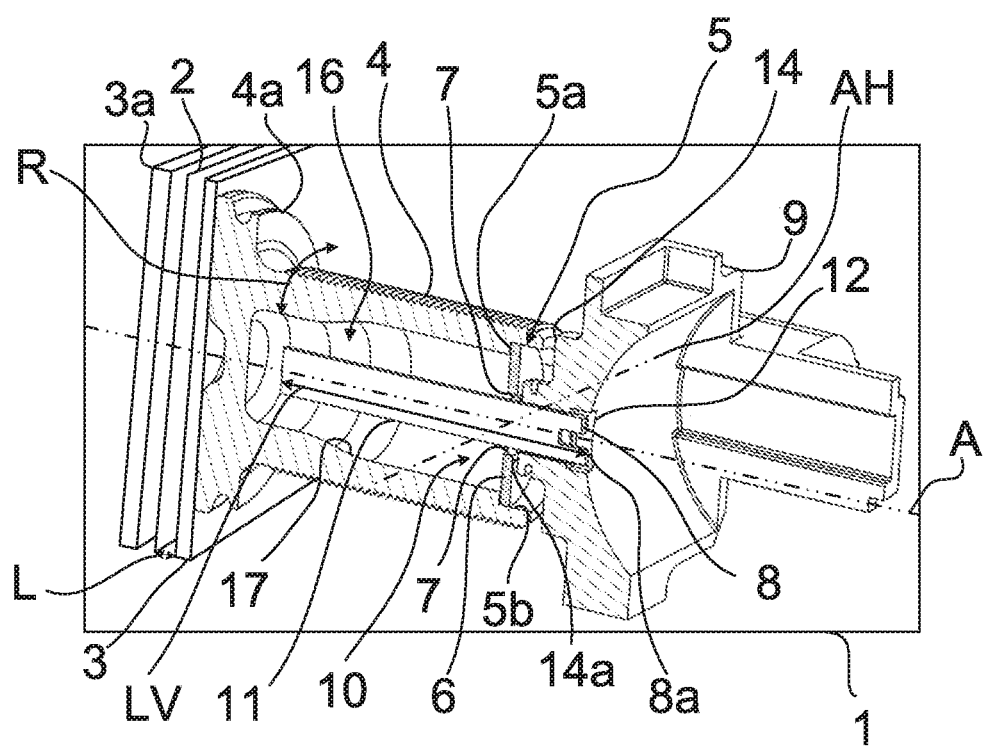
FIG. 1 shows a disc brake having an anti-rotation safeguard of the adjusting spindle, in a laterally sectioned view.

FIG. 1 shows a diagrammatically illustrated disc brake 1 having an anti-rotation safeguard 10 (shown in detail) of an adjusting spindle 4 and having a pressure plate 4a. In order to set an air play L between a brake lining 3, 3a and a brake disc 2, an adjustment of the adjusting spindle 4 along an axial axis A of the adjusting spindle 4 is required, in the direction of the brake linings 3, 3a. The adjusting spindle 4 is adjusted axially in the direction of the brake linings via a pressure piece 9 which lies opposite the pressure plate 4a and is arranged on the adjusting spindle, the air play L being set to a predefined magnitude. In order to avoid a simultaneous rotation R of the adjusting spindle 4 about the axial axis A, the anti-rotation safeguard 10 is arranged within the adjusting spindle 4 and within the pressure piece 9. In order to arrange the anti-rotation safeguard 10 within the adjusting spindle 4, the adjusting spindle 4 has an interior space 16 and a groove 5 which is shaped in a side wall 17. The groove 5 is arranged on that side of the side wall 17 which faces the interior space 16. In addition, the groove 5 is arranged at that axial end of the adjusting spindle 4 which lies opposite the pressure plate 4a. The anti-rotation safeguard 10 is configured from two individual components, namely a connecting element 11 and a fixing element 6. The fixing element 6 is a disc-shaped plate 6 having an opening 7 which is configured centrally in the plate 6. The plate 6 is arranged axially in the groove 5, and is supported axially on a supporting wall 5a of the groove 5 and radially on a side wall 5b of the groove 5. The plate 6 is therefore connected in a positively locking manner to the groove 5 of the adjusting spindle 4. The connecting element 11 which is configured as a plate strip 11 protrudes axially through the opening 7, the plate strip 11 being a punched metal part. The plate strip 11 has an axial length LV. The axial length LV of the plate strip 11 corresponds to an axial length LV, starting from the radially oriented head of the guide 12 of T-shaped configuration as far as the transition of the adjusting spindle 4 to the pressure plate 4a. The plate strip 11 is guided in the pressure piece 9 in a guide 12 of T-shaped configuration. Lugs 8, 8a are arranged on the plate strip 11 axially in the direction of the pressure piece 9.

During assembly, the plate strip 11 is guided axially by way of the guide 12 of T-shaped configuration, in the direction of the adjusting spindle 4. In order to secure the plate strip 11 against an axial movement, the lug 8a is deformed horizontally in the direction of a horizontal axis AH, in relation to the axial axis A. The lug 8a which is configured as a hook is supported axially on the pressure piece 9.

The opening 7 of the fixing element has the same rectangular shape as the plate strip, and secures the adjusting spindle 4 against a rotation about the axial axis A. The pressure piece 9 and the adjusting spindle 4 are not in contact with one another. The non-positive connection is transmitted via the pressure piece 9 to an adjusting nut (not shown) and via the thread of the adjusting spindle 4 to the adjusting spindle 4. The plate 6 and the pressure piece 9 are not in contact with one another.

Figure 2:
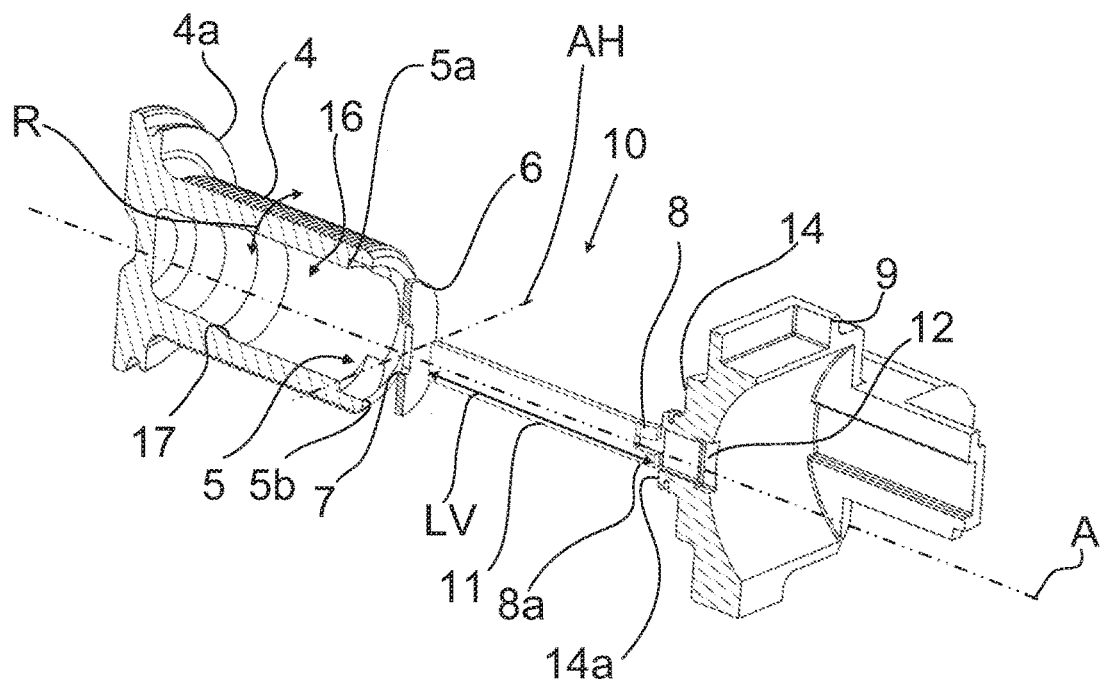
FIG. 2 shows a disc brake according to FIG. 1 as an exploded drawing.

FIG. 2 shows the adjusting spindle 4, the pressure piece 9 and the anti-rotation safeguard 10 according to FIG. 1 as an exploded drawing. The pressure piece 9, the adjusting spindle 4 with the pressure plate 4a, and the fixing element 6 which is configured as a disc-shaped plate 6 are shown in a laterally sectioned view. The disc-like shape of the plate 6 and the opening 7 of rectangular configuration of the plate 6 can be seen particularly clearly. In addition, the horizontally deformable lugs 8, 8a are shown.

Figure 2A:
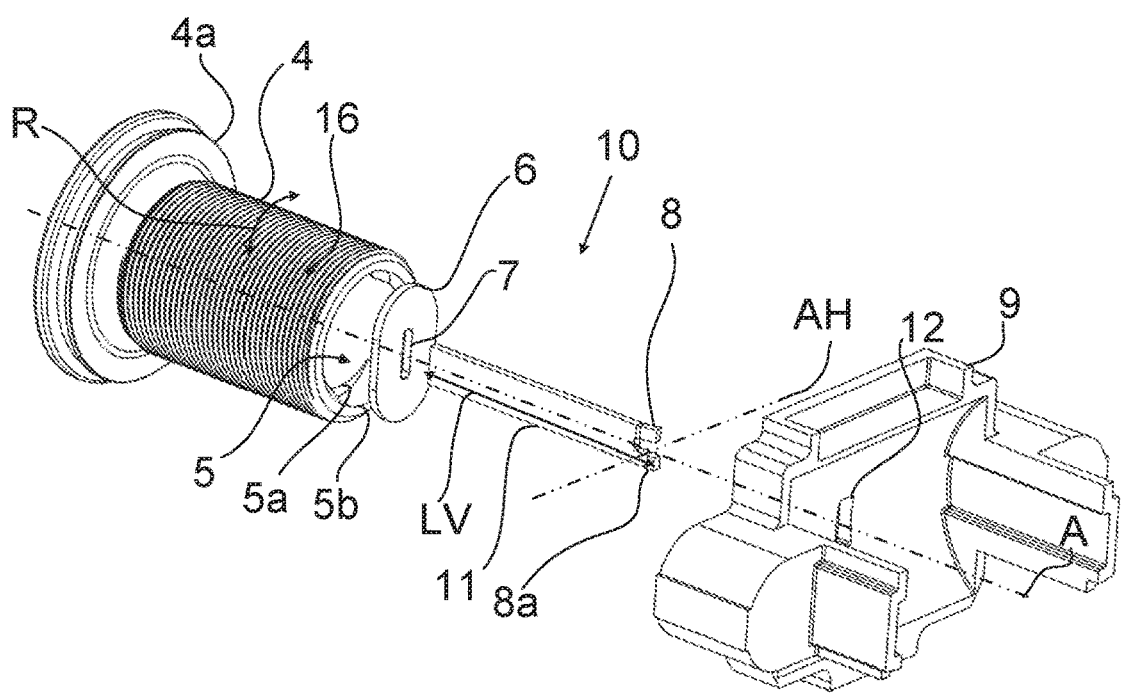
FIG. 2a shows a disc brake according to FIGS. 1 and 2 in an overall illustration.

FIG. 2a once again shows the adjusting spindle 4, the pressure piece 9 and the anti-rotation safeguard 10 according to FIG. 1 and FIG. 2 in a non-sectioned illustration.

Figure 3:
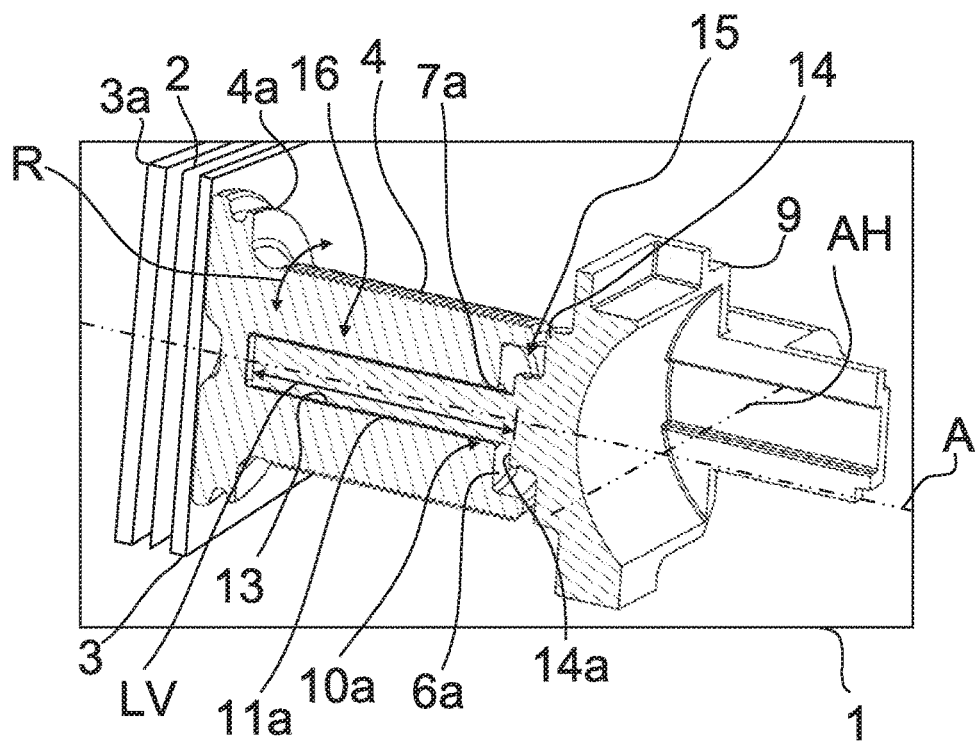
FIG. 3 shows a disc brake having an alternative anti-rotation safeguard of the adjusting spindle in a laterally sectioned view.
Figure 4:
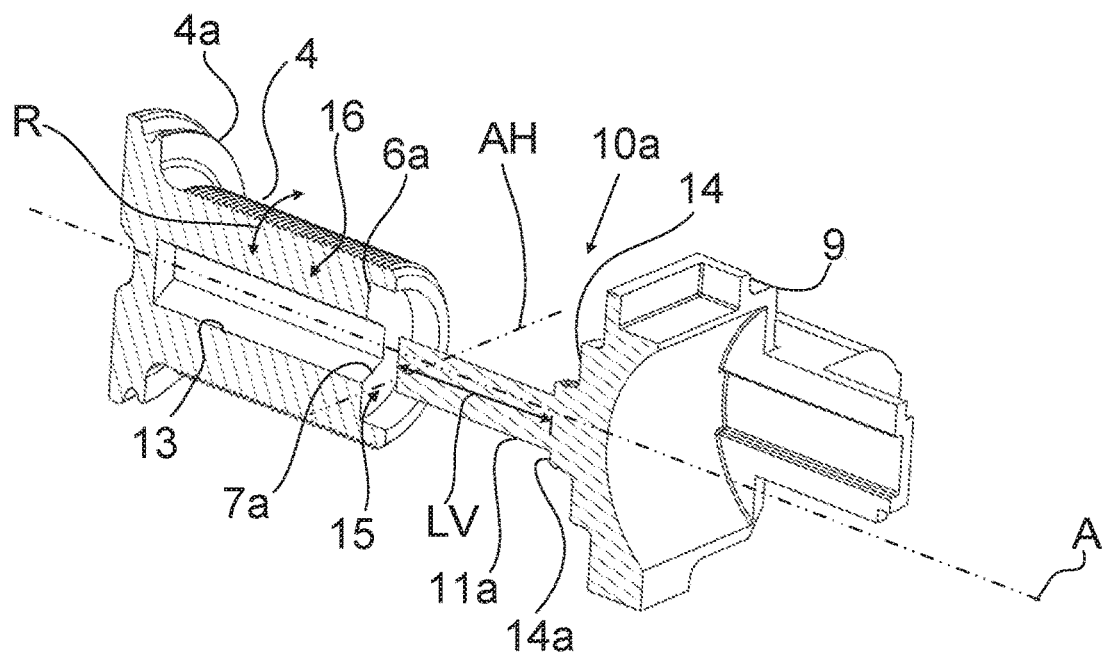
FIG. 4 shows a disc brake according to FIG. 3 as an exploded drawing.

FIG. 3 shows a disc brake 1 according to FIG. 1 with an alternative embodiment of the anti-rotation safeguard 10a, and FIG. 4 shows an alternative anti-rotation safeguard according to FIG. 3 in detail. Here, FIG. 3 shows the alternative embodiment of the anti-rotation safeguard 10a in the assembled state, and FIG. 4 shows the alternative anti-rotation safeguard 10a in the dismantled state. In the alternative embodiment, a connecting element 11a and the pressure piece 9 are formed from a sintered component. The connecting element 11a is formed hexagonally, the connecting element 11a being guided in a bore 13 of the adjusting spindle 4. Moreover, the fixing element 6a and the adjusting spindle 4 are formed from a cold-worked part. A groove 5 for receiving the fixing element 6a (as is the case in FIG. 1 and FIG. 2) is not provided in the alternative embodiment of the anti-rotation safeguard 10a. Rather, the fixing element 6a is a part of a blind bore 15, more specifically the fixing element 6a is the axial bottom of the blind bore 15. An opening 7a for receiving and guiding the connecting element 11a is configured centrally in the fixing element 6a. Starting from the opening 7a, a bore 13 for receiving and guiding the connecting element 11a is configured along the axial axis A of the adjusting spindle 4, as far as the transition to the pressure plate 4a. The dimensions and shape of the bore 13 and the opening 7a of the fixing element 6a are identical. That is to say, the bore 13 also has a hexagonal shape.

Figure 4A:
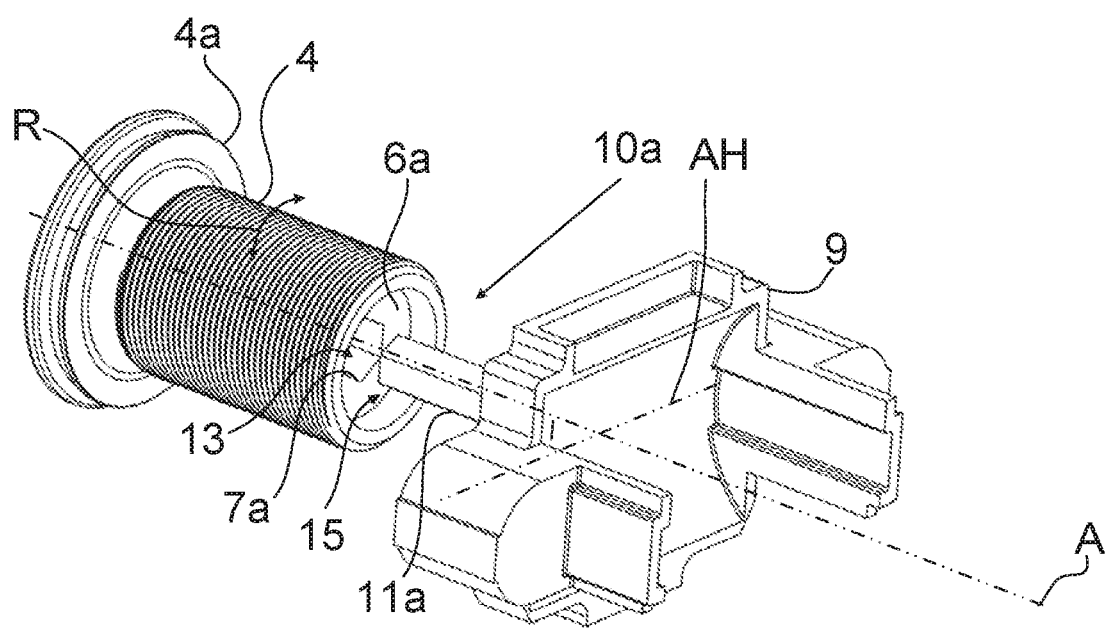
FIG. 4a shows a disc brake according to FIGS. 3 and 4 in an overall illustration.

FIG. 4a once again shows the adjusting spindle 4, the pressure piece 9 and the anti-rotation safeguard 10a according to FIG. 3 and FIG. 4 in a non-sectioned illustration.

While the above description constitutes the preferred embodiments of the present invention, the invention is susceptible to modification, variation and change without departing from the proper scope and fair meaning of the accompanying claims.

LIST OF REFERENCE CHARACTERS AS ART OF THE DESCRIPTION

1 Disc brake
2 Brake disc
3, 3a Brake linings
4 Adjusting spindle
4a Pressure plate
5 Groove of the adjusting spindle 4
5a Supporting wall of the groove 5
5b Side wall of the groove 5
6; 6a Fixing element
7; 7a Opening of the fixing element 6, 6a
8, 8a Lugs
9 Pressure piece
10; 10a Anti-rotation safeguard
11; 11a Connecting element
12 Guide of T-shaped configuration
13 Bore
14, 14a Bearing faces of the pressure piece 9
15 Blind bore
16 Interior space of the adjusting spindle 4
17 Side wall of the adjusting spindle 4
A Axial axis of the adjusting spindle 4
AH Horizontal axis of the adjusting spindle 4
L Air play
LV Axial length of the connecting element 11
R Rotation of the adjusting spindle 4

The invention claimed is:
1. A disc brake (1) for vehicles, comprising:
a brake disc (2),
at least two brake linings (3, 3a),
an adjusting spindle (4) axially adjustable toward the brake linings (3, 3a) for setting an air play (L) between the brake linings (3, 3a) and the brake disc (2), the adjusting spindle (4) having:
  a pressure plate (4a) arranged on the adjusting spindle (4) on a side facing the brake linings (3, 3a), and
  a pressure piece (9) arranged on the adjusting spindle (4) on a side axially opposite from the brake linings (3, 3a),
wherein the pressure piece (9) has an anti-rotation safeguard (10; 10a) for blocking a rotation (R) of the adjusting spindle (4), and the anti-rotation safeguard (10; 10a) axially engages the adjusting spindle (4),
wherein, axially in the direction of the adjusting spindle (4), the pressure piece (9) has a guide (12) for receiving a connecting element (11) of the anti-rotation safeguard;
wherein the anti-rotation safeguard (10) comprises a fixing element (6; 6a), with an opening (7; 7a), and the connecting element (11; 11a) is configured to engage the opening (7; 7a) of the fixing element (6; 6a);
wherein, the guide (12) is of T-shaped configuration.

2. The disc brake (1) according to claim 1, wherein the connecting element (11) is connected in a positively locking manner to the pressure piece (9).

3. The disc brake (1) according to claim 1, wherein the connecting element (11) is of plate-shaped configuration and, axially in the direction of the pressure piece (9), has lugs (8, 8a) for fixing the connecting element (11) in the guide (12) of T-shaped configuration.

4. The disc brake (1) according to claim 3, wherein at least one lug (8, 8a) can be deformed horizontally, in relation to the axial axis (A).

5. The disc brake (1) according to claim 1, wherein the connecting element (11; 11a) has a rectangular, square or hexagonal cross-section.

6. The disc brake (1) according to claim 1, wherein the fixing element (6a) is arranged on the adjusting spindle (4) axially opposite from the pressure plate (4a), the fixing element (6a) and the adjusting spindle (4) being configured as one structural unit.

7. The disc brake (1) according to claim 6, wherein the adjusting spindle (4) has a bore (13) along an axial axis (A), and the bore (13) complements the connecting element (11, 11a) in length and shape.

8. The disc brake (1) according to claim 1, wherein the opening (7; 7a) of the fixing element (6; 6a) complements the connecting element (11; 11a) in shape.

9. The disc brake (1) according to claim 1, wherein the connecting element (11) is guided axially by the way of the guide (12) in the direction of the adjusting spindle to fix the connecting element (11) to the pressure piece (9).

10. A disc brake (1) for vehicles, comprising:
a brake disc (2),
at least two brake linings (3, 3a),
an adjusting spindle (4) axially adjustable toward the brake linings (3, 3a) for setting an air play (L) between the brake linings (3, 3a) and the brake disc (2), the adjusting spindle (4) having:
a pressure plate (4a) arranged on the adjusting spindle (4) on a side facing the brake linings (3, 3a), and
a pressure piece (9) arranged on the adjusting spindle (4) on a side axially opposite from the brake linings (3, 3a),
wherein the pressure piece (9) has an anti-rotation safeguard (10; 10a) for blocking a rotation (R) of the adjusting spindle (4), and the anti-rotation safeguard (10; 10a) axially engages the adjusting spindle (4),
wherein the anti-rotation safeguard (10) comprises a fixing element (6; 6a), with an opening (7; 7a), and a connecting element (11; 11a) configured to engage the opening (7; 7a) of the fixing element (6; 6a),
wherein the fixing element (6) is arranged in a positively locking manner in a groove (5) of the adjusting spindle (4), axially opposite from the pressure plate (4a).

11. The disc brake (1) according to claim 10, wherein the connecting element (11a) and the pressure piece (9) are configured as one structural unit.

12. A disc brake (1) for vehicles, comprising:
a brake disc (2),
at least two brake linings (3, 3a),
an adjusting spindle (4) axially adjustable toward the brake linings (3, 3a) for setting an air play (L) between the brake linings (3, 3a) and the brake disc (2), the adjusting spindle (4) having:
a pressure plate (4a) arranged on the adjusting spindle (4) on a side facing the brake linings (3, 3a), and
a pressure piece (9) arranged on the adjusting spindle (4) on a side axially opposite from the brake linings (3, 3a),
wherein the pressure piece (9) has an anti-rotation safeguard (10; 10a) for blocking a rotation (R) of the adjusting spindle (4), and the anti-rotation safeguard (10; 10a) axially engages the adjusting spindle (4),
wherein the anti-rotation safeguard (10) comprises a fixing element (6; 6a), with an opening (7; 7a), and a connecting element (11; 11a) configured to engage the opening (7; 7a) of the fixing element (6; 6a),
wherein the fixing element (6) is a plate (6) made of a metal material or a plastic.

13. The disc brake (1) according to claim 12, wherein the connecting element (11a) and the pressure piece (9) are configured as one structural unit.

* * * * *